July 31, 1956 — M. W. BANOWETZ, SR — 2,756,457
CLIP FOR FISH CLEANING DEVICE
Filed Jan. 20, 1955

INVENTOR,
Michael W. Banowetz, Sr.
BY E. E. Vrooman & Co.,
ATTORNEYS

United States Patent Office 2,756,457
Patented July 31, 1956

2,756,457

CLIP FOR FISH CLEANING DEVICE

Michael W. Banowetz, Sr., New Orleans, La., assignor to Master Industries Inc., New Orleans, La., a corporation of Louisiana Application January 20, 1955, Serial No. 483,036

1 Claim. (Cl. 17—8)

This invention relates to a fish cleaning device.

An object of the invention is to provide a novel and an efficient device to enable the operator to support a fish while it is being dressed, for immediate cooking, or for storing in a freezing compartment of a refrigerator.

Another object is to provide a device that will enable the operator to readily position the fish on a base and allow the dressing operation, including means for easy cutting off the head of the fish by using an ordinary knife.

A still further object of the invention is the provision of a cleaning base or board for scaling fish and cleaning same, in which the device provides means for clamping the tail of the fish, facilitating the removal of the scales and entrails of the fish, as well as the head, thereby providing a very efficient device as a whole for the purpose specified.

With the foregoing and other objects in view, this invention comprises certain novel constructions, combinations, and arrangements of parts as will be hereinafter fully described, illustrated in the accompanying drawings, and more particularly pointed out in the appended claim.

Figure 1:
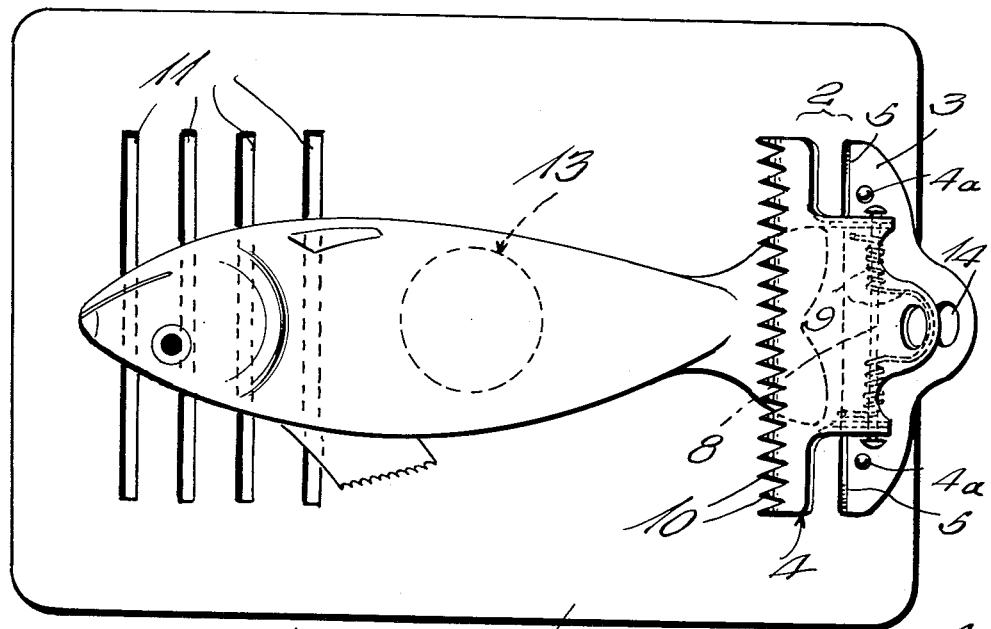
Fig. 1 is a top plane view of a fish cleaning device constructed in accordance with the present invention, and showing a fish thereon.

Referring to the drawings by numerals, the base 1 or foundation member may be a plate, or board, of any desirable size. On said base 1, preferably near the right hand end thereof, is positioned a clamp device 2. This clamp device 2, comprises a primary section 3, and an auxiliary section 4. Suitable fastening means as rivets 4a fixedly anchor the primary section 3 to base 1. The primary section 3 is provided with upstanding stops 5 which are engaged, as a rule, by the fish's tail during the cleaning action. Further, these stops 5 prevent the fish from being shoved too far towards the right hand end of the base 1. The auxiliary section 4 is provided with two ears 6 that register with ears 7 on the primary section 3, Fig. 3. A bolt 8 extends through ears 6 and 7, Fig. 3, connecting the primary and auxiliary sections pivotally mounted together. The bolt 8 is provided with a coil spring 9 which normally holds the auxiliary section 4 in a clamping position. When the operator wishes to remove the auxiliary section 4 from its engaging position all he has to do is to grip the outer ends of the primary and auxiliary sections, pressing them together. The auxiliary section 4 is provided with teeth 10 which extend downwardly and inwardly, for better grasping the fish's tail as clearly shown in Fig. 2.

Figure 2:
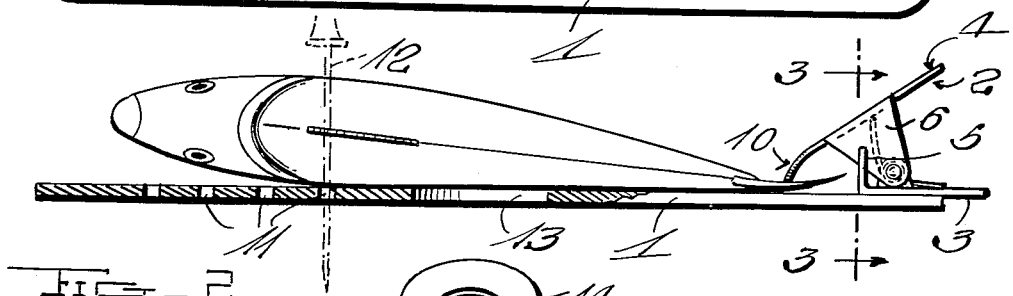
Fig. 2 is a longitudinal sectional view of the device.
Figure 3:
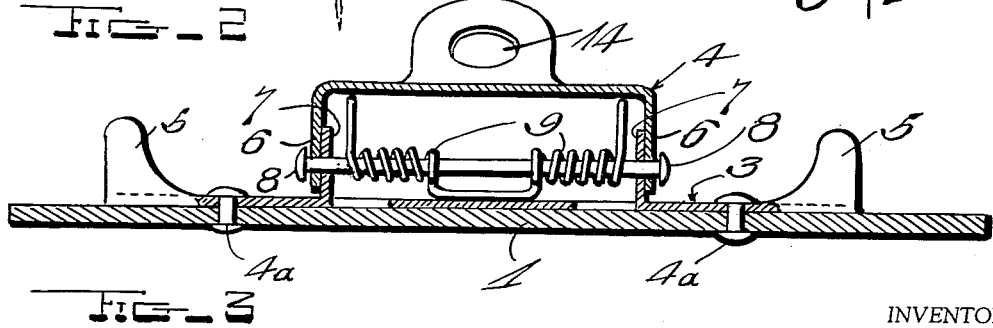
Fig. 3 is an enlarged sectional view taken on line 3—3, Fig. 2, and looking in the direction of the arrows.

The base 1 is preferably provided with a plurality of parallel elongated slots 11 to permit the insertion of a knife or like instrument shown by dotted lines 12, Fig. 2. The device being provided with a plurality of slots 11 allows it to accommodate different lengths of fish, whereby their heads can be easily removed.

In approximately the center of the base 1 is preferably a large round hole or aperture 13. By placing the device over or on a receptacle, the scales and entrails, as well as the tail when cut off, can be pushed through the hole or aperture 13, falling into said receptacle. This construction is very advantageous and the device as a whole is extremely useful.

The primary section 3 is provided with an aperture 14 which may be used for suspending the device on a suitable hook or nail when not in use.

While I have described the preferred embodiment of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claim.

What I claim is:

As a new article of manufacture, a fish cleaning device comprising an elongated rectangular base, a fish tail engaging clip at one end of said base, said clip including a toothed jaw, spring biased into engagement with said base and a pair of oppositely disposed stops on either side of said clip, a plurality of equidistantly spaced slots extending transversely of said base in parallelism with said jaw, said slots being disposed centrally of the transverse axis of said base and extending across a substantial portion of the width thereof, the spacing of the slots accommodating different sizes of fish, and a relatively large centrally disposed aperture extending through said base whereby the refuse from the cleaned fish may be passed for disposal.

References Cited in the file of this patent

UNITED STATES PATENTS

| | | |
|---|---|---|
| 2,500,032 | Helberg | Mar. 7, 1950 |
| 2,607,070 | Wertz et al. | Aug. 19, 1952 |
| 2,609,024 | Russ | Sept. 2, 1952 |
| 2,617,190 | Taylor | Nov. 11, 1952 |